March 20, 1945.  E. H. J. PHILLIPS  2,371,979
AIRCRAFT LANDING SYSTEM
Filed June 26, 1941  6 Sheets-Sheet 1

INVENTOR
Eugene H. J. Phillips
BY
Henry G. Dybvig
ATTORNEY

March 20, 1945.  E. H. J. PHILLIPS  2,371,979
AIRCRAFT LANDING SYSTEM
Filed June 26, 1941  6 Sheets-Sheet 2

INVENTOR
Eugene H. J. Phillips
BY
Henry G. Lbwig
ATTORNEY

March 20, 1945.   E. H. J. PHILLIPS   2,371,979
AIRCRAFT LANDING SYSTEM
Filed June 26, 1941   6 Sheets-Sheet 3

INVENTOR
Eugene H. J. Phillips
BY
ATTORNEY

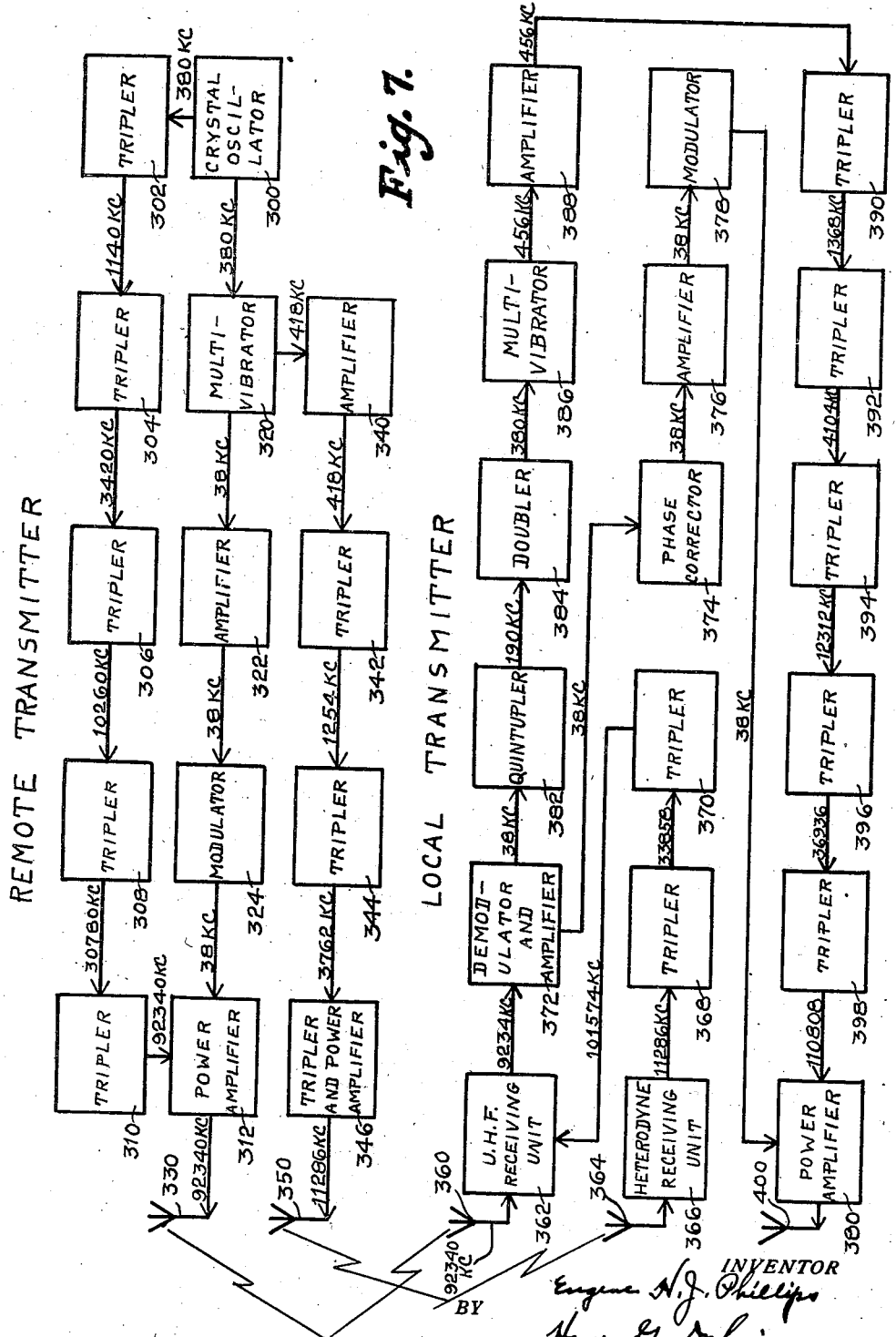

March 20, 1945.  E. H. J. PHILLIPS  2,371,979
AIRCRAFT LANDING SYSTEM
Filed June 26, 1941  6 Sheets-Sheet 6

Patented Mar. 20, 1945

2,371,979

UNITED STATES PATENT OFFICE 2,371,979

AIRCRAFT LANDING SYSTEM

Eugene H. J. Phillips, Fort Worth, Tex.

Application June 26, 1941, Serial No. 399,856

8 Claims. (Cl. 250—11)

This invention relates to landing systems for use in landing aircraft and more particularly to means for perceptibly indicating the position of an aircraft with respect to the airport while landing.

In the past, numerous attempts have been made to aid pilots in making blind landings, sometimes referred to as instrument landings.

In the various types of landing systems used in the past, insufficient data is furnished the pilot to make a satisfactory landing under various conditions. In making instrument landings by the use of the systems developed heretofore, too much depends upon the sound judgment of the pilot. In addition thereto, at least some of the instruments are not reliable under all conditions.

It is an object of this invention to supply the badly needed elements not now available to alleviate a considerable portion of the hazards experienced by airmen during low visibility landing operations.

Another object of this invention is to provide facilities which give accurate indication and may be auxiliary to the present facilities generally used or the facilities may be used independently of the present equipment to indicate to the pilot the relative position of the aircraft with respect to a landing field.

Another object of this invention is to graphically indicate the all important factor of position. As long as the pilot knows that he is in alignment with the runway and is receiving an accurate indication of position of the runway and his respective progress, then he may fly the airplane into the ground almost without regard to altitude, in so far as the familiar process of leveling off for a three point landing is concerned.

Another object of this invention is to discard the use of the amplitude of a radio signal, but instead, utilize the frequency of two signals emanating from different points for indicating the relative position of the aircraft relative to the landing field.

Another object of this invention is to provide visual indicating means that may be mounted on the instrument board of the aircraft, for visually indicating the longitudinal position and the altitude of the aircraft with respect to the landing field.

Another object of this invention is to utilize visual means of obtaining a perspective of the runway with both ends thereof indicated, as well as the progressive position of the aircraft relative to the runway.

Another object of this invention is to enable the pilot to combine the function of the altitude and longitudinal position of the aircraft relative to the runway on one chart, clearly visible to the pilot.

Another object of this invention is to accurately locate the relative position of the aircraft with respect to the runway, so as to permit the pilot to utilize to the best advantage the steep gliding features of present day aircraft as soon as the edge of the field has been cleared and to level off at a lower angle, so as to glide down to the point where contact is eventually made with a great deal of the runway left, which permits the pilot to utilize the characteristic of the plane and to utilize the runway to the greatest advantage.

Another object of this invention is to provide a landing system utilizing a pair of signals having a wave length that is a function of the length of the landing field, these signals being generated in constant phase relation, thereby utilizing the relative phase difference at any point between the stations to graphically illustrate the position of the plane relative to the field.

Another object of this invention is to generate signals on opposite sides of the field, which signals are in phase opposition beyond the stations and out of phase between the stations.

Another object of this invention is to utilize the conventional radio range system or radio direction finder system in directing the aircraft to the landing field and to utilize locally generated signals that are ineffective a predetermined distance beyond the landing field, which signals are utilized to indicate the relative position of the aircraft when in the vicinity of the landing field.

Another object of this invention is to provide a pair of generating stations on opposite sides of the landing field, the stations being located in the general direction of landing, the distance between the stations being a function of the size of the landing field.

Another object of this invention is to provide a visual aerograph landing system utilizing a pair of signals of equal wave length, said wave length being a function of the length of the landing field.

Other objects and advantages reside in the construction of parts, the combination thereof and the mode of operation, as will become more apparent from the following description.

Figure 3:
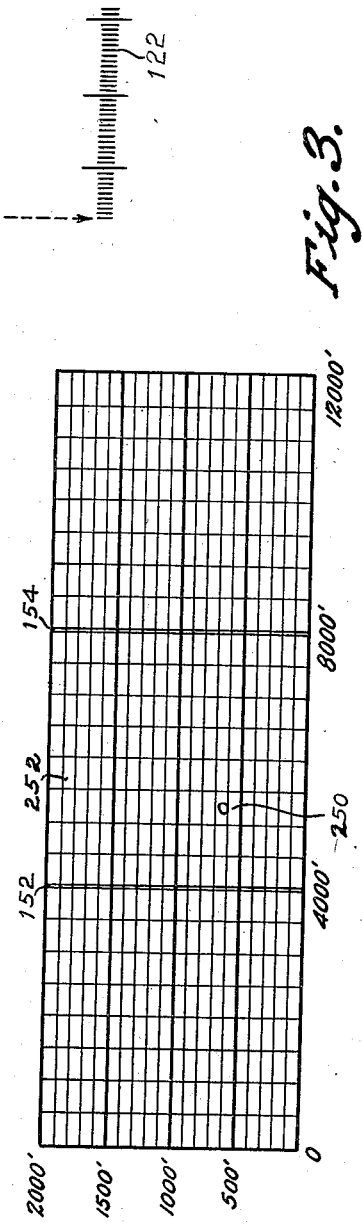

Figure 3 discloses a screen or panel of translucent material that may be used in association with the aerograph.

Figure 4:
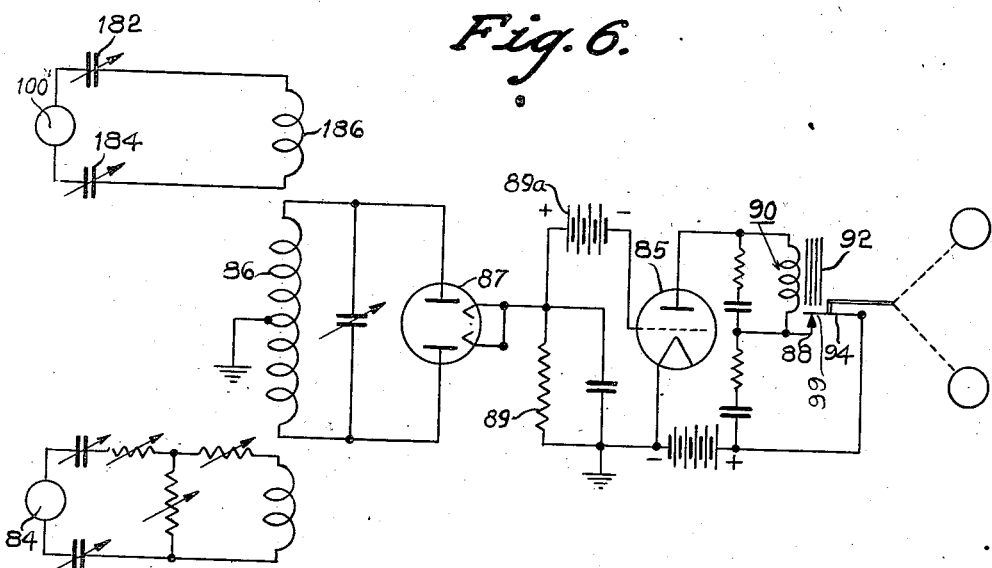

Figure 4 discloses schematically the "Thyratron" circuit arrangement.

Figure 5:
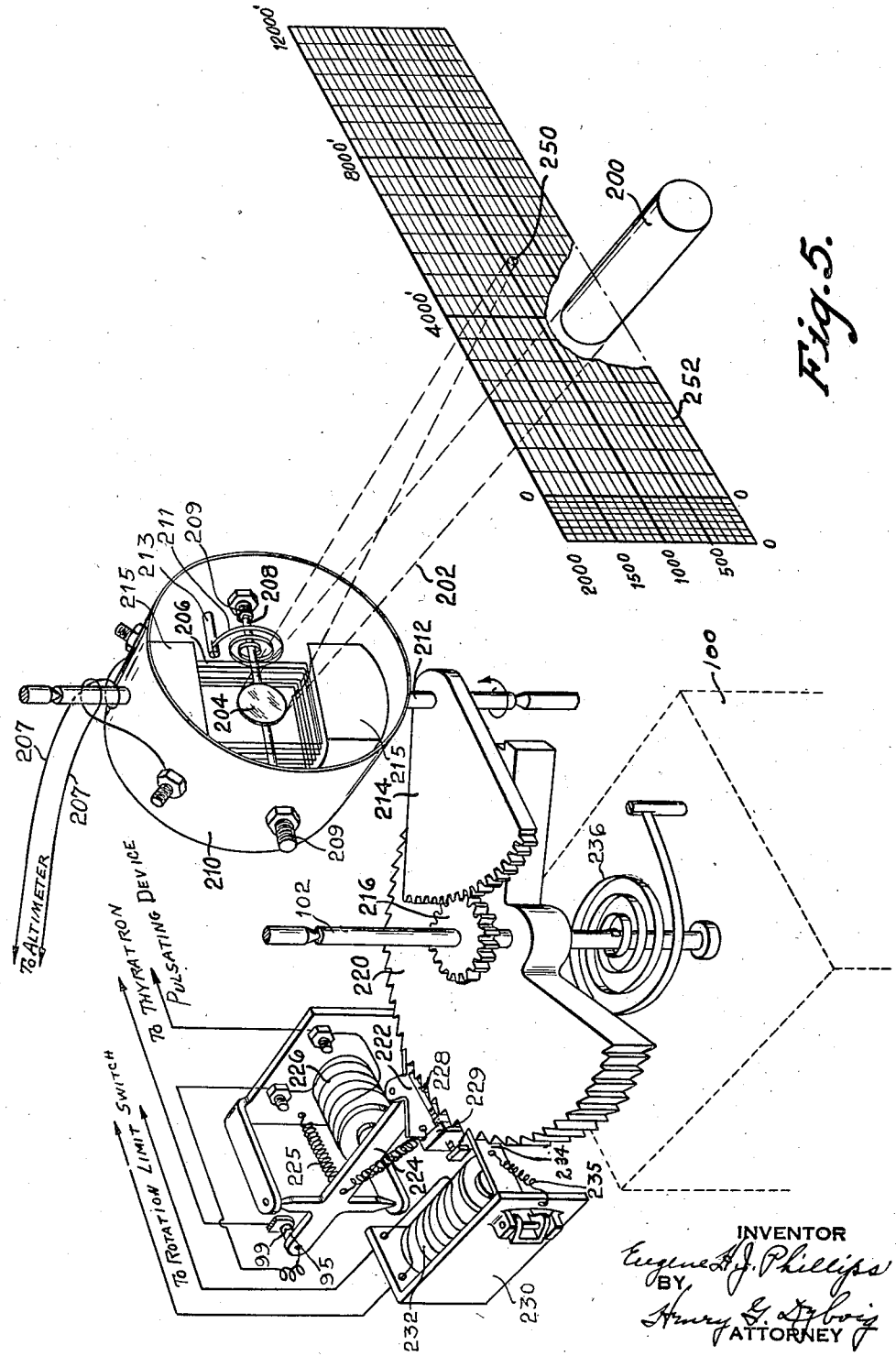

Figure 5 discloses an indicating device for indicating graphically the location of the plane relative to the boundary and the ground level of the field.

Figure 6:
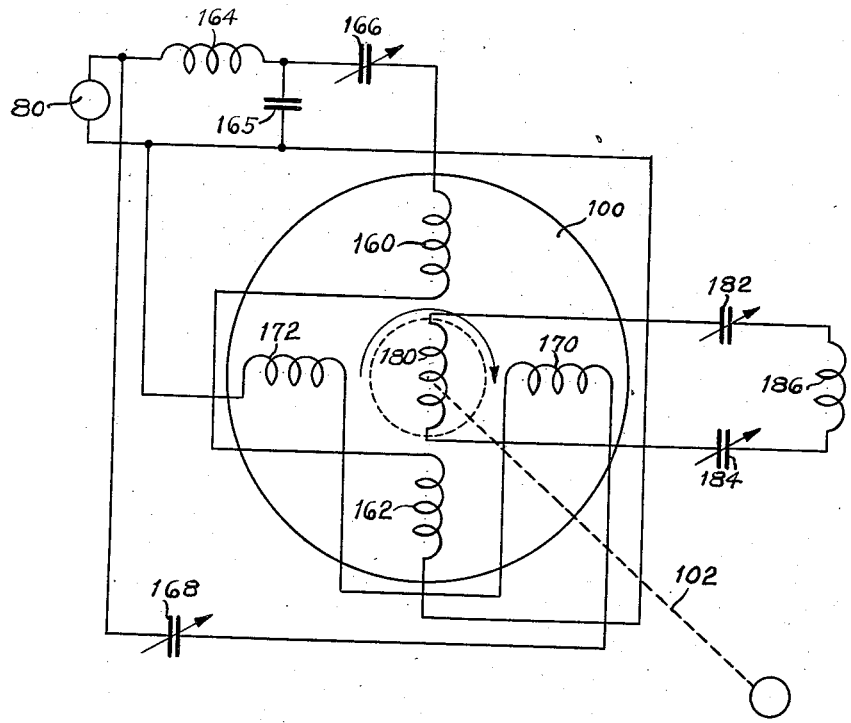

Figure 6 discloses schematically the phase shifting circuit arrangement.

Figure 7 is a schematic wiring diagram of a remote transmitter and a local transmitter, wherein the transmitted signal from the remote transmitter is utilized in modulating the signals generated at the local transmitter and in proper phase relation.

Figure 8:
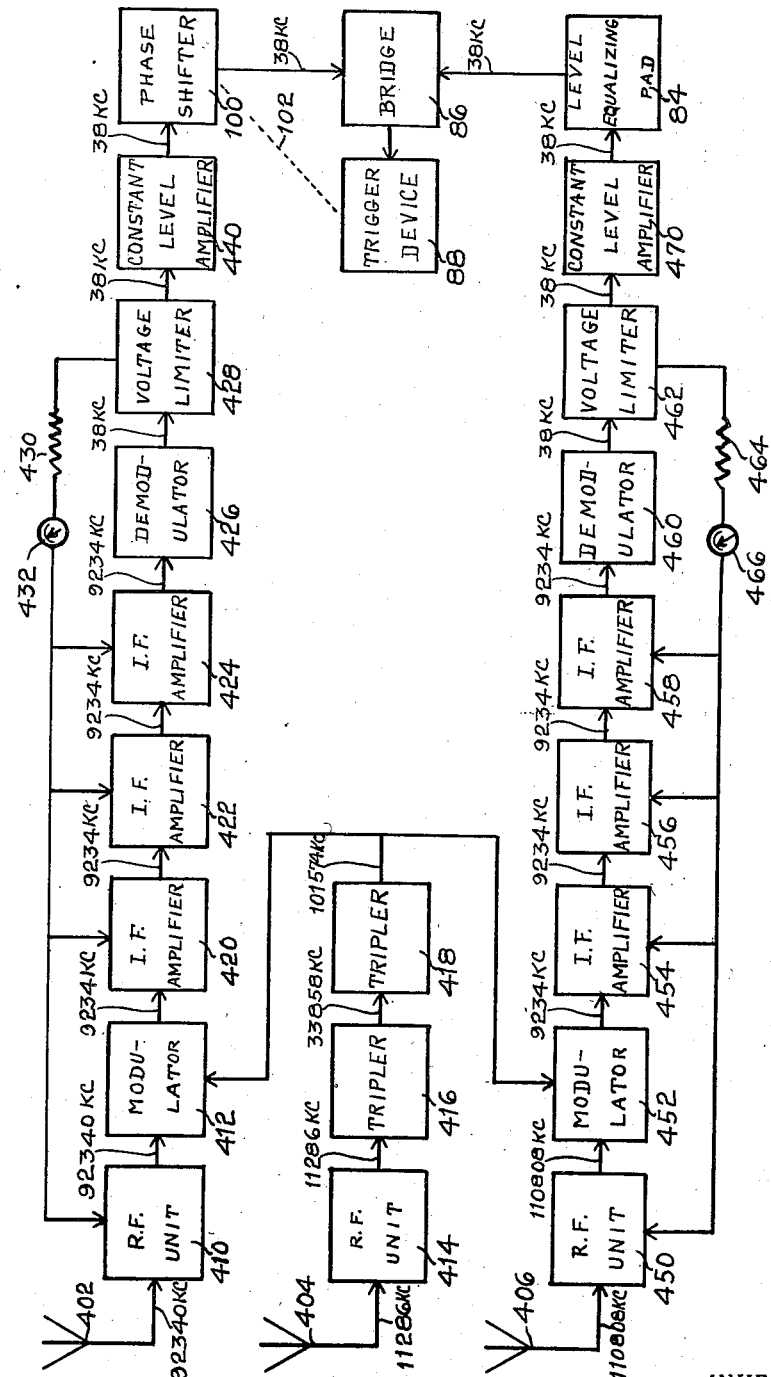

Figure 8 discloses a schematic wiring diagram of a dual channel radio receiver provided with a circuit receiving a third signal that is utilized in heterodyning the two signals received by the dual channel receiver.

The visual aerograph landing system disclosed herein, which is a landing system incorporating a visual graph, indicates graphically the relative position of the aircraft with respect to a particular runway on the landing field. This has been accomplished by providing a pair of transmitting stations aligned with the runway and located in spaced relation from the opposite ends thereof. The two broadcasting stations utilize a modulating signal having a wave length equal to twice the distance between transmitting stations. The modulating signal generated by one transmitting station is actually in phase with the modulating signal generated at the other station, so that if the two generated modulating signals are received by a dual radio receiver at one of the stations, it will appear as though the signals are 180° out of phase, in that the distance between the stations is equal to half a wave length. In other words, the time that is utilized in the transmitted signal traveling from one station to another is equal to half a cycle.

The carrier frequency current transmitted by one transmitting station has a different frequency from that transmitted by the other transmitting station. This is to permit the transmitted signals being selectively received in the aircraft. Being these modulating signals are equal in amplitude, equal in frequency and in phase, it can readily be seen that the two modulating signals beyond the transmitting stations will be 180° out of phase at all times, so that as the aircraft receives demodulated signals, these signals cancel each other.

As soon as the aircraft passes over one station and advances in the direction of the other station, the demodulated signal output of the two radio receivers will differ in phase relation as the airplane advances to the center of the runway where the two signals will then be absolutely in phase, in that this point is a quarter wave length from each of the transmitting stations. The phase angle of the forward transmitter when the aircraft is advanced to the center of the field will then have been advanced by 90° and the phase angle from the back transmitter will then have been retarded by 90°. As the aircraft advances to the opposite transmitter, the phase relation of the two signals will progress and retard through another 90° respectively. Phase shifts between the two waves will continue the same as before in the same direction, with the result that when the forward station is reached, it will be observed that the waves are in phase opposition, the same as they were over the back transmitter. The phase change is always in the same direction, regardless of which direction is being flown, so long as a straight line connecting the two transmitters is followed.

By providing a suitable "Thyratron" relay and phase shifter, the accurate position of the aircraft relative to the runways may be indicated visually upon a chart wherein the location may be indicated as abscissa. On the same chart the altitude may be registered as ordinates, so as to graphically illustrate both the altitude of the aircraft and the longitudinal position of the aircraft with respect to the runway. By this system it is possible for the pilot to cause the airplane to alight at the beginning of the runway, so as to utilize the entire length of the runway in arresting the movement of the aircraft, that is, coming to a stop.

Referring to the drawings, the reference character 10 indicates the end of the runway of an airport landing field having a plurality of runways 12, 14, 16 and 18. The number of runways, the arrangement thereof and the dimensions are optional and do not per se form a part of this invention. Let it be assumed that the length A—B of the runway is equal to 4000 feet. This length is optional, depending upon local conditions, et cetera.

A broadcasting station 20 is aligned with the runway 12 and spaced a distance from the end of the runway equal to the length of the runway. Another broadcasting station 22 is aligned with the runway and located beyond the opposite end. By this arrangement, the distance A—B is equal to the distance A—C and is equal to the distance B—D. In other words, C—D is equal to three A—B.

The generated signal at the transmitting station 20 has a wave length equal to twice the distance from C to D and a wave length equal to six times the distance from A to B. A like signal is generated at the other station 22 in the same phase relation, so that the signal generated at one station is in phase with respect to the signal generated at the other station. The signal generated at the station 20 and the signal generated at the station 22 are used as a modulating signal to modulate carrier currents. One carrier current of a predetermined frequency is used as a transmitting signal from station 20 and another frequency carrier current is transmitted from station 22. Amplitude modulation is preferably used in modulating the carrier currents. Preferably, ultra high frequency carrier currents are used, although this depends entirely upon the available channels. The frequency of the transmitted carrier signal is a matter of choice.

It is very desirable that the modulating signals generated at the two stations be equal in amplitude, equal in wave length and absolutely in phase. It is very desirable to eliminate vagaries from appearing in the transmission pattern and to create a system for controlling the signals at each station, so that the transmitted signals are absolutely independent of changing weather conditions or other changes that may interfere with the visual indications for use by the pilot. The transmission phase pattern is always under constant control and unchanged regardless of weather conditions and other circumstances that may influence the transmission pattern. Although transmission lines may be used between the transmitters to establish control, such transmission lines have velocities of propagation constant much different from that observed from currents transmitted through space. This means that the transmission lines would either have to be spaced or would require a phase correcting network. Such transmission lines would probably consist of several elements which would be separated by a considerable length and therefore subject to unlike weather conditions. The lines would be subject to considerable phase shift from time to time and controlling means must then be employed at one end of each line to guard against a change in phase angle from occurring between the broadcasting stations.

It is preferable to control the stations without the use of a transmission line. Single controlling means built around a radio receiving channel to extract energy from both transmitting channels and connected to one broadcasting station to make that one transmitter stay in step with respect to the other is preferable.

There is one pair of transmitting stations for each runway; but only the transmitting station for the selected runway is utilized. The airplane is directed toward and aligned with the selected runway by a suitable radio range approach course or a separate runway localizer course, as is well known to those skilled in the art.

The aircraft utilizing this landing system is provided with a symmetrically arranged dual channel radio receiver, one channel for receiving the signal transmitted by the station 20 and the other for receiving the signal transmitted by the station 22. The antenna 30 supplies a signal to an ultra high frequency amplifier and signal selecting device 34 and the antenna 32 supplies its signal to the ultra high frequency amplifier and signal selecting device 36.

A crystal oscillator 40 energizes the frequency multipliers 42 and 44, so that the frequency multiplier 44 has an output oscillating current having a frequency equal to one-half the sum of the frequency of the carrier current received by the antenna 30 plus the frequency of the carrier current received by the antenna 32. If, for example, the carrier current received by the antenna 30 has a frequency of 91 mc. and the carrier current received by the antenna 32 has a frequency of 111 mc., the sum of these two would be equal to 202 mc. One-half of this would be 101 mc., the output of the frequency multiplier 44. Instead of two frequency multipliers, any suitable number of frequency multipliers may be used to obtain the desired frequency output of the frequency multiplier 44.

The output of the frequency multiplier 44 is divided, so that one channel energizes the modulator 46 and the other channel energizes the modulator 48. The intermediate frequency produced by the modulators 46 and 48 will be 10 mc. This is supplied to one or more signal amplifiers 50 and 52 respectively. A second oscillator 54 supplies oscillating currents to a second pair of modulators 56 and 58. It is not necessary that the second oscillator 54 be controlled by a crystal, as a slight variation in the frequency of the output currents will not materially influence the operation of the system. The first crystal oscillator 40 must produce the proper signal in order that the same beat frequency output is supplied to the amplifiers in both channels. If the frequency supplied by the oscillator 54 varies slightly, it will cause a like variation in both channels. For the purpose of illustration, the frequency of the oscillator 54 may be 11.7 mc. or 8.3 mc., so as to produce a second intermediate frequency of 1.7 mc.

The outputs of the second modulators 56 and 58 are supplied to the intermediate frequency amplifiers 60 and 62 respectively, used in energizing the demodulators 64 and 66 respectively. The voltage output of the demodulators 64 and 66 is supplied to voltage limiters 68 and 70. The voltage limiters 68 and 70 may also function as a source of A. G. C. voltage for energizing or biasing the grids of the signal amplifiers 34, 36, 50, 52, 60 and 62.

The grid current of the voltage limiters flowing through resistors 72 and 74 is on the order of microamperes; but due to the high value of the resistors 72 and 74, a sufficient voltage output is obtained to produce automatic gain control grid bias voltage for each of the amplifying stages. Milliammeters 76 and 78 are preferably connected in series with resistors 72 and 74 respectively, which milliammeters, in addition to serving as a check on the proper functioning of both channels of the radio receiver, may also be used to indicate the approach of the aircraft to the landing field. The meters 76 and 78 may be referred to as signal strength meters and within limits may be used as an indication of the approximate location of some point distant from the transmitters.

Whenever this signal strength reaches a predetermined level, this may be used to energize an electronic switch built into the receiver, which switch is used to complete the connection of the output of the dual channel receiver of the aerograph instrument, which is now about to be described. The electronic switch, in addition to interconnecting the aerograph instrument, may also cause a pilot light to be energized, so as to visually indicate to the pilot that the aircraft is approaching the landing field. This will serve as a warning to the pilot to make ready for landing in plenty of time.

The output of the voltage limiters 68 and 70 is supplied to the constant level amplifiers 80 and 82 respectively. The output of the constant level amplifier 80 is supplied to phase shifting device 100, which will be described more fully later. The output of the constant level amplifier 82 is supplied to a constant impedance load 84, which has an impedance to match the impedance of the phase shifter 100, so that the loss through the impedance 84 is equal to the loss through the phase shifter 100. Thus, the output of the phase shifter and the output of the impedance 84 is of constant value.

The circuit diagram used in the phase shifter 100 is shown in Figure 6. The output of the amplifier 80 is used to energize the primary windings 160, 162, 170 and 172. These windings are divided into halves and arranged in phase opposition with respect to the core or axis of rotation of the phase shifting device. An inductance 164 and a variable condenser 166 are connected in series with the primary windings 160 and 162. The inductance 164 cooperates with the condenser 166 to shift the current supplied to the windings 160 and 162 by 90°. The windings 170 and 172, arranged at right angles with respect to the windings 160 and 162, are connected in series with a condenser 168 and across the output of the amplifier 80. The fluxes or magnetic lines of force of the windings 160 and 162 are substantially 90° out of phase with the fluxes generated by the windings 170 and 172. The rotor of the phase shifting device is carried upon the shaft 102 illustrated by a dotted line in Figure 6 and carries a secondary winding 180 connected in series with the variable condensers 182 and 184 and the winding 186 used in energizing the bridge 86. By rotating the shaft 102, it can readily be seen that the phase relation of the output of the winding 180 will be varied as the angular relation of the winding or coil 180 is changed with respect to the primary windings 160 and 162 and 170 and 172.

The output of the phase shifter 100 and more particularly the output winding 186 is coupled to a winding 86 shown in Figure 4, which is also coupled to the output of the load impedance 84. If the output of the phase shifter 100 and the output of the load impedance 84 are in phase, no current will be generated in the winding 86. As soon as the phase relation between the winding 186 and the output of the load impedance 84 is out of phase, a current is generated in the winding 86, so as to supply a voltage to the anodes of the diode rectifier tube 87. When the anodes of the rectifier tube 87 are energized, a current flows through the resistance 89, thereby generating a voltage across this resistance. This supplies a grid voltage to the tube 85. Normally without a voltage across the resistance 89, the grid of the tube is supplied with a negative grid bias from the battery 89a sufficient in magnitude to prevent current flowing from the anode to the cathode of the tube 85. As soon as the voltage supplied by the winding 186 is out of phase with the voltage supplied by the load impedance 84, the voltage of the grid of the tube 85 is raised, so as to cause the current to flow from the anode to the cathode of the tube 85, thereby energizing the relay motor 90, so as to actuate the phase shifting device to rotate the movable coil 180 in the phase shifter 100.

When the phase relation of the output of the coil 180 is in phase opposition to the output of the impedance 84, no energy will be supplied to the "Thyratron" 85. The relative phase relation of the incoming signals received by the dual channel receiver is utilized to indicate the relative position of the aircraft with respect to the selected runway. The device utilizing the phase differences of the incoming signals to indicate the relative position of the aircraft with respect to the runway has been shown in Figure 5. In this figure a beam of light emanating from a suitable source of light 200 directs a beam or ray of light 202 upon a mirror 204 reflecting a spot of light 250 on the rear of a ground glass screen 252. This glass screen is ruled with parallel horizontal and parallel vertical lines. The vertical lines have been shown as parallel straight lines. In reality, these vertical lines should have a curvature to accommodate inherent phase shift due to altitude. Although in the drawings the spot of light 250 has been shown as a circle, this spot of light could be in any other configuration, as for example, in the shape of an arrowhead with the point directed downwardly, so that the point could be used to indicate the exact position of the aircraft.

The ray of light from the source of light 200 is directed upon a mirror 204 fixedly mounted upon a shaft 208 journalled in suitable bearings 209 adjustably mounted in a suitable support 210, which may be a cylindrical shell, as shown, or may consist of a bifurcated member or it may have any other suitable configuration. The shaft 208 is free to rotate in the bearings and is actuated in one direction by a motor spring 211, having one end attached to the shaft 208 and the other end fixedly attached to a suitable stud 21 mounted in the frame or cylindrical shell 21 The shaft 208 supports a winding 206 mounted between a pair of fixed permanent magnets 21 The coil winding 206 is energized through a pa of leads 207 from the altimeter, not shown. The frame or cylindrical shell 210 is fixedly attached to the shaft 212 supporting a gear sector 21 driven by a gear 216 fixedly attached to the shaft 102. The shaft 102 is journalled in suitable bearings. The lower end of the shaft is connected to the winding 180, as described in connection with Figure 6. Obviously, the upper end of the shaft could support the winding 180 if desired.

The motor 90 for rotating the shaft 212 includes a ratchet gear sector 220 attached to the shaft 202 and actuated by a pawl 222 supported upon an armature 224 actuated by an electromagnet 226 connected to the Thyratron tube circuit. As the magnet 226 is energized, the armature 224 is attracted to the magnet against the spring 225, which may be a leaf spring or a coil spring, as shown. As the armature 224 is attracted by the magnet, the pawl 222 engages the ratchet tooth and actuates the gear sector so as to rotate the shaft 102, the gear 216 and the gear sector 214, which actuates the shaft 212 and rotates the support 210 and with it the mirror 204, shifting the spot of light 250 towards the right, as viewed in Figure 5. The mirror 204 is preferably slightly concave, so as to focus the ray of light on a very small area. Furthermore the shape may be such that the ray of light is in the form of an arrowhead, utilizing the point of the arrow to indicate the exact location. This is a matter of choice as to the design of the spot of light.

The armature 224 insulatingly supports a contact 95 normally engaging the fixed contact 99 when the armature is in the "out" position, as shown. As the magnet 226 is energized, the contact 95 separates from the contact 99, so as to deenergize the magnet 226. In the event the rotation of the shaft 102 is sufficient to shift the coil 180 so that its output is in substantially phase opposition with the other branch of the dual channel receiver, no current will flow through the magnet 226, which then remains deenergized after the armature has snapped back into its home position, as shown in Figure 5. In the event the shaft 102 has not been rotated sufficiently to accomplish the necessary phase shift in the output of the coil 180, the magnet 226 is again energized so as to advance the gear sector 220 another increment. Likewise, as soon as the aircraft progresses through a distance sufficient to cause a phase shift, the current through the "Thyratron" will again begin to flow so as to energize the magnet 226 to repeat the operation. Whenever the armature 224 is in the home position, the pawl 222 is held out of contact with the teeth on the sector 220 by an adjustably mounted screw 228 threadedly engaging a fixed support 229. However, as soon as the armature 224 is actuated by the electromagnet 226, the pawl 222 clears the end of the screw 228 so as to be spring urged into engagement with the gear teeth on the sector 220. A bracket 230 supports an electromagnet 232 adapted to release a pawl 234 biased by a suitable helical spring 235 into engagement with the teeth on the sector 220. As long as the magnet 232 remains de-energized, the pawl 234 prevents the spring motor 236 from rotating the gear sector 220 in a counterclockwise direction, as viewed in Figure 5. That is, as the armature 224 actuates the pawl 222, the gear sector 220 is rotated against the force exerted by the spring motor 236. The pawl 234 prevents return movement of the gear sector 220 whenever the armature 224 advances into its home position.

In order to reset the aerograph equipment, it is merely necessary for the operator to close the switch that energizes the electromagnet 232, which actuates the pawl 234 out of engagement with the ratchet teeth on the gear sector 220. Then as soon as the armature 224 advances to home position, if it is not already there, the spring motor 236 actuates the aerograph to its home position, or the starting point, at which time the spot of light 250 should register with the zero abscissa. In the event one of the channels in the radio receiver, or both of the channels, should get out of adjustment, so that the phase shift through one channel is not the same as through the other channel, or for any other reason the mechanical equipment should get out of adjustment, the spot of light 250 may not register with the zero abscissa. In that event, one of the channels, or both channels, may be adjusted so as to shift the spot of light to the zero position, or the screen 252 may be adjusted, so as to cause the zero abscissa to register with the spot of light 250. This, of course, must be done when the aircraft is out of the zone found between the two transmitting stations.

Mode of operation

For commercial aviation the radio range course is preferably provided with fan markers located beyond the field. For example, the first fan marker may be twenty-five miles from the field. This is a warning to the pilot that he is approaching the field. The second fan marker may be placed ten miles from the field. This is a second warning to the pilot that the field is near at hand. At this time the relay switching mechanism connects the phase shifting device and the parts associated therewith into the dual channel radio receiver. The rise in the grid current in the voltage limiter tube may be used to control the relay switching mechanism instead of the fan markers. This dual channel radio receiver, as far as amplification stages are concerned, is preferably energized at all times, so as to be in readiness. If the two channels are perfectly balanced and the phase shifting device properly adjusted, the light on the rear of the screen 252 will remain substantially on the zero line. In the event it is a few degrees off the zero line, it may suggest that one of the channels of the radio receiver, or both, are slightly detuned, so as to cause a slight phase shifting of the incoming signals. The condition may be rectified or the screen 252 shifted, so as to register with the beam of light shining on the rear of the ground glass screen.

As the aircraft approaches the first transmitting station, no change takes place in the phase shifting device. It remains stationary. As soon as the aircraft passes over the first transmitting station, the phase relation of the two incoming signals will shift. This is taken care of by the phase shifting device which indicates on the screen 252 the degree of phase shift between the incoming signals.

The altimeter registers the height of the airplane over the landing field—preferably an absolute type of altimeter is used, so as to measure the actual height of the aircraft above the field. The pilot does not find it necessary to do any mental calculations. He devotes his entire time to the control of the aircraft, merely watching the progress of the spot 250 on the screen 252. By this arrangement, he may manipulate his airplane without any mental calculations or estimations, depending upon the human element, and land the aircraft on the near end of the runway. When the aircraft is landed, he may then disconnect the phase shifting device from the dual channel receiver for the time being, resetting the motor and the parts associated therewith, in readiness for a succeeding landing operation. The phase shifting device may be automatically reset whenever the phase shifting device is deenergized.

On many landing fields the runways may not be the same length, that is, the distance from the end of the runway to the transmitter may not necessarily be 60 electrical degrees, measured in phase displacement between modulating signals. This does not defeat the utility of the system. There is a uniform distance between the transmitting stations of each pair of transmitting stations associated with a particular landing field. This permits the use of the same modulating wave length for all transmitting stations used in connection with this system at a particular airport. For commercial aviation a standardized frequency is preferably used. If, for example, the distance between two stations is equal to 12,000 feet, the distance between the stations forming each other pair of stations is also 12,000 feet. The runways may be of unequal lengths; but the transmitting stations should always be symmetrically disposed with respect to the runways. If one station is 4200 feet from the end of one runway, the other station associated with the other end of the runway should then preferably be the same distance from the runway, namely, 4200 feet.

As far as the aerograph is concerned, this may be easily taken care of by providing two pointers, shown as the double lines 152 and 154 in Figure 3, adjustably mounted in association with the aerograph screen or panel. Each pointer may be attached to a rack, not shown, having teeth thereon meshing with a pinion in such a manner that as the pinion is rotated, it spreads the pointers in unison or draws the points together. The pilot may receive a signal from the ground informing him as to the length of the runway. This may be accomplished automatically by means of a characteristic signal generated at the airport. If the runway is 4500 feet, he need merely adjust the pointers so that these register with the 4500 feet graduations. On the other hand, if the landing field is only 3600 feet long, the two pointers are drawn together, so that each pointer registers with the 3600 feet graduations, thereby showing graphically by adjustable means the ends of the particular runway.

Instead of using a modulating signal having a wave length equal to twice the distance between the transmitting stations, other signals may be utilized. For example, a beat frequency system could be utilized. The frequency of one modulating signal could be twice that of the other or the difference could be a beat frequency, which would indicate a predetermined distance between the stations. If, for example, the stations are 12,000 feet apart, two signals could be selected such that there would be a node every ten feet, or any other predetermined distance. Electrical signals generated in response to predetermined colors may be used as modulating signals. For example, one could be modulated in response to blue light rays and the other in response to yellow light rays. This would result in a signal varying from blue through the various shades of green to yellow, as the aircraft progresses from one transmitting station to the other. Furthermore, sound signals could be used for registering the progress of the aircraft.

Within the purview of this invention any suitable type of signal for modulating the carrier currents may be used. Furthermore, within the purview of this invention, modulating signals may be eliminated entirely and instead, two transmitting signals be so selected that the frequency difference will result in a plurality of nodes and antinodes, as the aircraft progresses from one transmitting station to the other.

Suitable tuning devices are preferably incorporated in each of the dual channel radio receivers to select the proper incoming signals. These tuning devices are preferably adjustable, so as to permit the dual channel radio receiver to be used with various frequencies of transmitted signals. Furthermore, the output circuits, namely, the phase shifter and the circuit matched therewith, may also be tuned so as to be responsive to the particular modulating signal used at the particular landing field. This provision has been made so as to maintain the proper balanced condition between the two channels and so as to utilize the equipment to the greatest advantage. When the aerograph system is used on a fixed frequency, as recommended for commercial airlines, the tuning is preferably done at the factory and subsequent adjustments are preferably made at authorized service stations, thereby eliminating tuning while in flight.

The device described thus far has been described primarily in association with civil landing fields or airports. This description would probably suggest that the system is primarily intended for civil aviation. However, it is not so limited. This system may be used equally as well for military purposes. It may be used in association with temporary landing fields, it being merely necessary to utilize two portable transmitting stations aligned with the particular runway and properly spaced. Thus, it is seen that this system has great flexibility. It may be used as a permanent installation in association with civil airports or fixed landing fields, or it may be used with temporary landing fields.

In Figures 7 and 8 a modified system of generating, transmitting and receiving the signals has been shown. In this system the crystal control oscillator in the dual channel radio receiver, as disclosed in Figure 2, has been eliminated and instead, a third signal is transmitted from the ground, which is utilized in providing the proper oscillating signal.

This system includes one transmitter, which for convenience will be referred to as a remote transmitter, located in proper spaced relation from one end of the runway, and a second transmitter, which will be referred to as a local transmitter, located in proper spaced relation from the opposite end of the runway. The remote transmitter transmits two signals, one an ultra high frequency modulated signal and the other a lower frequency signal. Both of these signals are used at the local transmitter for generating the proper ultra high frequency signal and the proper modulating signal for transmission from the local transmitter. The two signals transmitted by the remote transmitter and the signal transmitted by the local transmitter are received in the aircraft receiver. The ultra high frequency signal transmitted by the remote transmitter is received through one of the channels of the receiver in the aircraft. The ultra high frequency signal transmitted by the local transmitter is received by the other channel of the dual channel receiver in the aircraft. The lower or heterodyne frequency signal transmitted by the remote transmitter is received by an intermediary receiver and is used to generate an oscillating frequency supplied to both of the channels of the dual channel radio receiver in the aircraft, as will appear more fully from the detailed description that follows.

For the purpose of illustration, let it be assumed that the remote transmitter uses as a carrier frequency a frequency of 92,340 kc. that is modulated by a 38 kc. signal used as the modulating signal to indicate the position of the aircraft relative to the station. Furthermore, let it be assumed that the auxiliary signal used as an oscillating signal has a frequency of 11,286 kc. Furthermore, let it be assumed that the carrier signal transmitted by the local transmitter has a frequency of 110,808 kc. and that the modulating signal used in modulating this carrier current is also 38 kc. The modulating signal of the remote transmitter is in proper phase with the modulating signal of the local transmitter. These signals may be obtained for the purpose of illustration by means of a crystal oscillator 300 having an output of 380 kc. This frequency is multiplied by a series of five triplers to a carrier frequency of 92,340 for use in the remote transmitter. The output of the crystal oscillator energizes a tripler 302 having a signal output of 1140. This is supplied to a second tripler 304 having an output of 3420 kc. The signal output of this tripler 304 is supplied to a tripler 306 having an output of 10,260 kc. The signal output of this tripler 306 is supplied to a tripler 308 having a signal output of 30,780. The output of this tripler 308 is supplied to a tripler 310 having an output of 92,340 kc. This is supplied to a power amplifier 312.

The crystal oscillator also energizes a multivibrator 320 where the tenth sub-harmonic is used so that this multi-vibrator has an output of 38 kc. that is supplied to the amplifier 322 that energizes the modulator 324 that is used in modulating the carrier current, the output of which is supplied to the power amplifier 312 energizing the antenna 330 broadcasting the 92,340 kc. carrier current modulated with a 38 kc. modulating signal.

The multi-vibrator also energizes the amplifier 340, which has been tuned to resonate with 418 kc., which is the fundamental plus the first subharmonic, that is, 380 kc. plus 38 kc. This frequency is multiplied through a series of three triplers to a final frequency of 11,286 kc., where sufficient power is developed and radiated to control the heterodyne section of the air-craft receiver. The amplifier 340 supplies a signal of 418 kc. to the tripler 342 having an output current of 1254 kc. supplied to the tripler 344 having an output of 3762 kc. that is supplied to a tripler and power amplifier 346 having an output of 11,286 kc. having an output of 100 watts used in ergizing the broadcast antenna 350. All of these stages are found at the remote transmitter. At the local transmitter all of the signals, that both the carrier current and the modulating frequency, are controlled from signals received from the remote transmitter. At this local transmitter, a section of a radio receiver picks up energy at 92,340 kc., while another section of the radio receiver picks up energy at 11,286 kc. The output of the antenna 330 is received by the antenna 360 at the local transmitter, which energizes the ultra high frequency receiving unit 362. A second antenna 364 receives the heterodyne signals from the auxiliary transmitter having the antenna 350. The signal received by the antennas 364 has a frequency of 11,286 kc., which is supplied to the heterodyne receiving unit 366 having an output of 11,286 kc., which is multiplied by a series of two triplers arriving at a heterodyne frequency of 101,574 kc. The output of the heterodyne receiving unit 366 is supplied to the tripler 368, having an output frequency of ,858 kc. This is supplied to the tripler 370 having an output of 101,574 kc. By mixing the frequency of 92,340 kc. received by the ultra high frequency receiving unit and the frequency of 101,574 kc., the side bands of the former frequencies are modulated to an intermediate frequency of 9234 kc. one tenth of the carrier frequency. After amplification at the intermediate frequency, demodulation in the stage 372 reproduces the original 38 kc. current. The output of the demodulator and amplifier 372 is supplied to two channels, one of which generates a carrier current and the other a modulating current. As the modulating current has a frequency of 38 kc., the output of the demodulator and amplifier 372 need merely be corrected as to phase. This is accomplished by supplying the output of the demodulator 372 to the phase corrector 374. The output of the phase corrector 374 is supplied to the amplifier 376 which energizes the modulator 18 having the output supplied to the power amplifier 380, which will be described more fully later.

The carrier current for the power amplifier 380 is supplied from the demodulator and amplifier 372 through a quintupler multiplying the frequency of 38 times five, followed by a doubler which delivers an output frequency of 380 kc. the same as the crystal or fundamental frequency. This is accomplished through the following stages. The output of the demodulator and the amplifier 372 is supplied to a quintupler 382 having an output of 190 kc. supplied to a doubler 384 having an output of 380 kc. energizing a multi-vibrator 386. From this multi-vibrator 386 the 380 kc. signal plus the second sub-harmonic of 76 kc. is supplied to the amplifier 388. The output of the amplifier 388 having a frequency of 456 kc. is supplied to the tripler 390 having an output of 1368 kc. used in energizing the tripler 392 having an output of 4104 kc. used in energizing the tripler 394 having an output of 12,312 kc. used in energizing the tripler 396 having an output of 36,936 kc. used in energizing the tripler 398 having an output of 110,808 kc. supplied to the power amplifier 380. Preferably 90% modulation is used and the output signal supplied from the power amplifier 380 may have 100 watts power used in energizing the broadcast antenna 400.

The local transmitter transmits a modulated signal having a carrier current having 110,808 kc. frequency. The remote transmitter transmits a carrier current from the antenna 330 having a frequency of 92,340 kc. In addition thereto, the remote transmitter transmits the 100 watt signal having a frequency of 11,286 kc. This is an auxiliary signal used in producing the oscillating or heterodyne frequency signal to be utilized in the radio receiver found in the aircraft, which will now be described.

Figure 1:
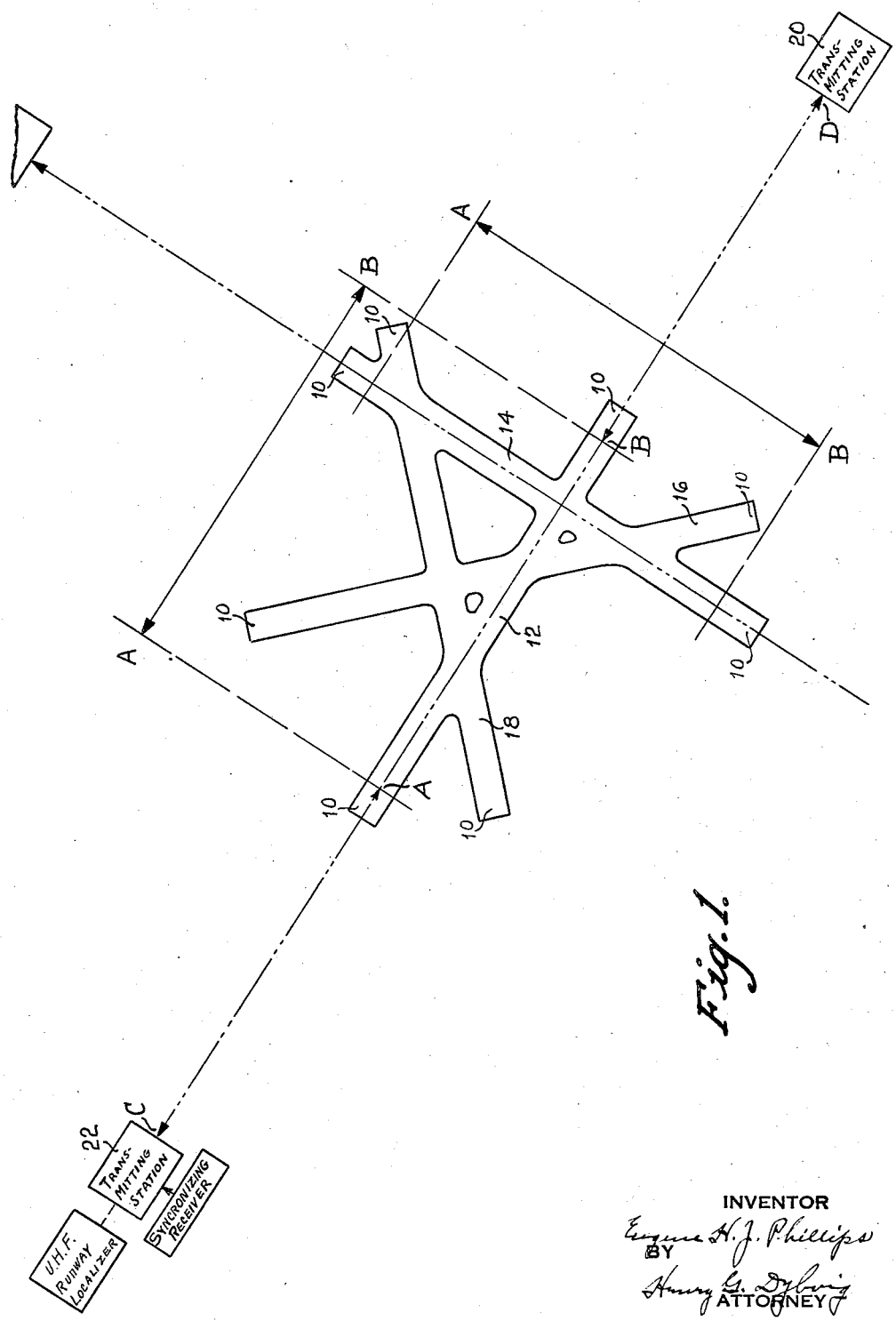
Figure 1 is a schematic view of an airport, disclosing the transmitting stations used in association with one of the runways. Similar transmitting stations are also utilized with the other runways, which have not been shown for the sake of clearness.
Figure 2:
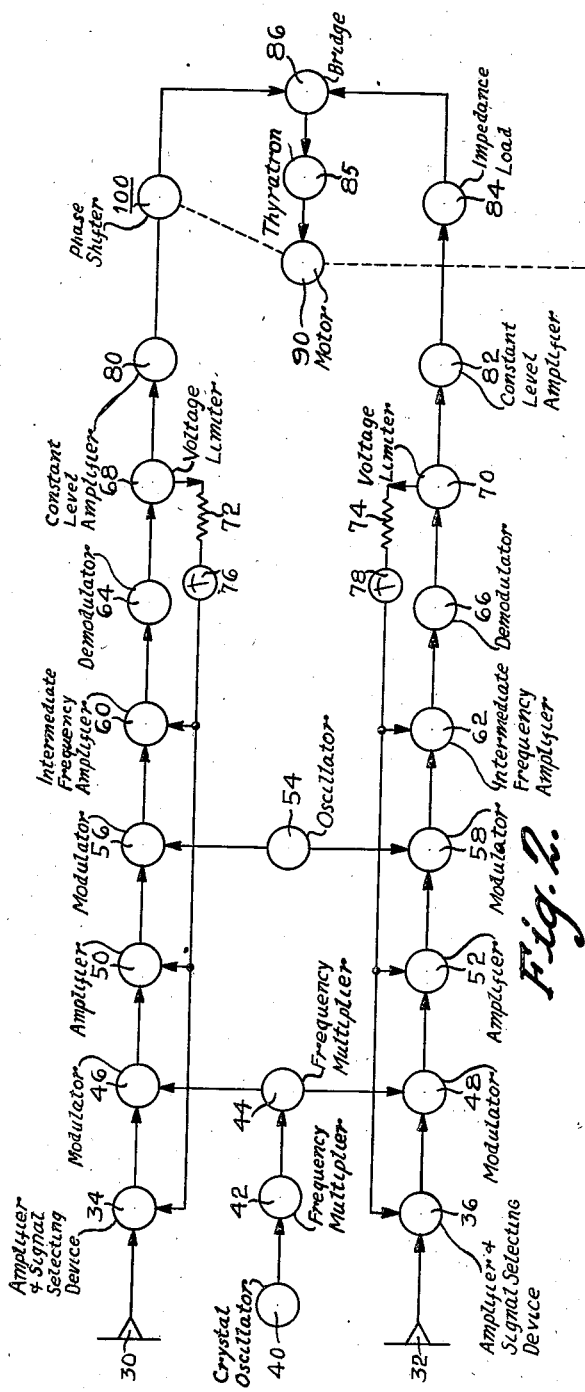
Figure 2 is a schematic diagram of dual channel radio receivers, shown merely for the purpose of illustration.

The radio receiver in the aircraft differs from the radio receiver described in connection with Figure 2, in that this radio receiver is provided with a tuned amplifier securing energy from an additional antenna at 11,286 kc. for the heterodyne section. This amplifier is used in lieu of the crystal oscillator circuit 40, 42 and 44 used in the embodiment shown in Figure 2. When this heterodyne signal is mixed with both the carrier frequencies, absolute uniformity of intermediate frequencies of one-tenth of the lowest carrier frequency will result, regardless of changes of humidity, temperature, supply voltage and any other circumstances that may influence the reception. Vibration may detune some of the stages from time to time to some slight degree; but frequencies in any case will not be changed by any factor within or having to do with the receiver in the airplane. The resultant effects of any of these changes in the stages for the most part will be changes in amplitudes; but this receiving system is not based on amplitude. Furthermore, amplitude changes are wiped out. The aerograph system disclosed herein is free from static influence, due to the use of accurate voltage limiting devices.

In view of the auxiliary heterodyning frequency, the receiver in Figure 8 has been shown as having three antennas, namely, the antennas 402, 404 and 406. The antenna 402 energizes a radio frequency unit 410 that is tuned to receive the signal transmitted by the antenna 330 at the remote transmitter. The signal received by the radio frequency unit 410 has a frequency of 92,340 kc. The output of the radio frequency unit is supplied to a modulator 412. In addition to receiving the output of the radio frequency unit, the modulator is energized by a heterodyning frequency that is supplied by the radio frequency unit 414 connected to the antenna 404. The radio frequency unit 414 is tuned to receive the auxiliary signal broadcast by the antenna 350 at the remote transmitter, which signal has a frequency of 11,286 kc.

The output of the radio frequency unit 414 is supplied to the tripler 416 having an output of 33,858, which in turn is supplied to the tripler 418 having an output of 101,574. The output of the tripler is used as an oscillating frequency supplied to the modulator 412 which has an output of 9,234 kc. This is supplied to an amplifier 420 and a second amplifier 422 and if desirable a third amplifier 424, the output of which may be supplied to a demodulator 426 having an output of 38 kc. supplied to the voltage limiter 428. This voltage limiter has two outputs, one of which is supplied to the grid leak 430 connected in series with a grid current meter 432 and used as a grid bias in the stages 410, 420, 422 and 424. The second output of the voltage limiter 428 is supplied to a constant level amplifier 440 supplied to the phase shifter, which may be identical to the one described in connection with the radio receiver described in connection with Figure 2. That being the case, this will be referred to as phase shifter 100. The antenna 406 is connected to a radio frequency unit 450 tuned to receive a signal having a frequency of 110,808 kc., which is the signal generated by the antenna 400 located at the local transmitting station. The output of the radio frequency unit 450 is supplied to the modulator 452, which is also energized by the tripler 418, so that the output of the modulator is equal to the difference of 110,808 kc. and 101,574 kc. or 9234 kc. This is used to energize the intermediate frequency amplifiers 454, 456 and 458 which have an intermediate frequency of 9234 kc. The output of the intermediate frequency amplifier 458 is supplied to the demodulator 460 having an output of 38 kc. supplied to a voltage limiter 462 having two outputs, one of which energizes the grid leak 464 having one terminal connected to the grid current meter 466, the output of which is used to supply a grid bias and the radio frequency unit 450 and to each of the intermediate frequency amplifiers 454, 456 and 458. The second output of the voltage limiter 462, having a frequency of 38 kc., is supplied to the constant level amplifier 470 which has its output supplied to the level equalizer pad 84, which may be identical to that described in connection with Figure 2. From here on the signals may be utilized in connection with the aerograph indicator described in connection with Figure 5.

In the system disclosed in Figures 7 and 8, all of the generated signals and all of the received signals tie up to a common crystal controlled oscillator 300. Thus, a balanced condition may be maintained, insuring accurate phase relation of the output of the two channel radio receivers energizing the phase shifter 100.

The frequencies selected for the system shown in Figures 7 and 8 have merely been selected for purposes of illustration. Any other suitable frequencies may be used within the purview of this invention. However, in order to aptly illustrate the underlying principles, it seems this could best be done by using specific frequencies as a concrete example, without the system being limited to the particular selected frequencies.

This system lends itself to control from the approaching aircraft. This is especially desirable in the event of war. During war times if the transmitters were in operation at all times, it would indicate to the enemy the location of the field. By providing an automatic control responsive to a signal generated in the approaching aircraft, such that the transmitters are energized only in response to such signals, the enemy would then be unable to locate the airport excepting during the landing of a friendly aircraft. As soon as the aircraft has been landed, the transmitters could then be stopped, so as to remain dormant until the approach of the succeeding aircraft.

"Aerograph," as used herein, is used to indicate an aircraft landing system incorporating visible means for indicating the relative position of an aircraft with respect to the runways of a landing field, which aerograph functions whenever the aircraft is within the immediate vicinity of the landing field.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a landing system for use in ascertaining the relative position of an aircraft with respect to a runway, the combination including a pair of transmitting stations aligned with the runway and equally spaced therefrom, means at each of said transmitting stations for generating a modulating signal having a wave length equal to twice the distance between the transmitting stations, the modulating signals having a predetermined phase relation with respect to each other, means for modulating carrier currents transmitted by said transmitting stations, the carrier current transmitted by one station differing in frequency from the carrier currents transmitted by the other station, a dual channel radio receiver in the aircraft for receiving the transmitted signals, a graph-like screen, means for indicating the relative longitudinal position of the aircraft with respect to the runway as abscissa upon the graph-like screen, an altimeter for measuring the height of the aircraft, and means responsive to the altimeter for indicating the altitude of the aircraft as ordinates on said graph-like screen.

2. In a landing system for use in ascertaining the relative position of an aircraft with respect to runways on a landing field, the combination including a plurality of radio transmitting stations there being a pair of stations for each of the runways, means for transmitting radio signals from the pair of stations associated with a selected runway, the transmitted signals varying relative to each other throughout the distance between the stations, means in the aircraft for receiving the signals, an altimeter for registering the altitude of the aircraft, and visible means responding to both the receiving means and the altimeter for indicating the relative position of the aircraft with respect to the runway when the aircraft progresses between the stations.

3. In a landing system for use in ascertaining the relative position of an aircraft with respect to runways on a landing field, the combination including a plurality of radio transmitting stations, there being a pair of stations for each of the runways, means for transmitting radio signals from the pair of stations associated with a selected runway, the transmitted signals varying relative to each other throughout the distance between the stations, means in the aircraft for receiving the signals, an altimeter for indicating electrically the altitude of the aircraft, visible means for graphically indicating the progress of the aircraft between the stations, said visible means including a translucent screen, means for producing a ray of light, a mirror mounted for oscillation about two axes substantially normal to each other, said mirror reflecting the ray of light on the rear of the translucent screen, means responding to the output signals of the receiving means for oscillating the mirror about one of said axes, and means responding to the altimeter for oscillating the mirror about the other axis so as to shift the reflection in response to changes in altitude and longitudinal position of the aircraft between the two transmitting stations.

4. In a landing system for use in ascertaining the relative position of an aircraft with respect to a runway selected from a plurality of runways, said system including a plurality of signal transmitting stations grouped in pairs, there being one pair for each runway, the pair of stations associated with each runway being aligned therewith and spaced from opposite ends thereof, the distance from each station to the near end of its runway being equal to the length of the runway, and means at each of the stations for generating a modulating signal having a wave length equal twice the distance between the stations, the modulating signals being generated in predetermined phase relation relative to each other.

5. In a landing system for use in ascertaining the relative position of an aircraft with respect to a runway selected from a plurality of runways, said system including a plurality of signal transmitting stations grouped in pairs, there being one pair for each runway, the pair of stations associated with each runway being aligned therewith and spaced from opposite ends thereof, the distance from each station to the near end of its runway being equal to the length of the runway, means at each of the stations for generating a modulating signal having a wave length equal to twice the distance between the stations, means for generating ultra high frequency broadcast signals in each of said stations, the signals generated at one station differing in frequency from the signals generated at the other station, and means for modulating the transmitting signals with said modulating signal.

6. In a landing system for use in ascertaining the relative position of an aircraft with respect to a runway selected from a plurality of runways, said system including a plurality of signal transmitting stations grouped in pairs, there being one pair for each runway, the pair of stations associated with each runway being aligned therewith and spaced from opposite ends thereof, the distance from each station to the near end of its runway being equal to the length of the runway, means for generating ultra high frequency carrier currents used as transmitting signals, there being one generating means for each of the transmitting stations, the frequency of the carrier current generated at one station differing from the frequency generated at the other station paired therewith, means for generating modulating signals at each of the stations, the wave length of the modulating signal being a function of the length of the runway, and means for modulating the carrier currents with the modulating signals so that the transmitted carrier currents transmit a signal that is a function of the length of the runway.

7. In a landing system for use in landing an aircraft on a landing field provided with one or more runways, said system including a remote transmitting station arranged in spaced relation from one end of the runway, a crystal control oscillator for generating a modulating current signal having a quarter wave length equal to the distance from the transmitting station to the center of the runway, means for expanding the generated oscillating signal to an ultra high frequency carrier current used in transmitting signals from said remote transmitting station, means for modulating the carrier current with the modulating current, means for expanding the modulating current to an intermediate frequency and auxiliary transmitting means for transmitting said intermediate frequency from said remote transmitting station; a local transmitting station arranged in spaced relation from the opposite end of the runway, said local transmitting station including means for receiving the signals transmitted by the remote transmitting station, said receiving means including means for utilizing the ultra high frequency signal and the intermediate signal to reproduce the original modulating signal, means for correcting the phase relation of said reproduced modulating signal with respect to the original modulating signal, and means for expanding modulating and transmitting the reproduced modulating signal from the local transmitting station; and means in the aircraft for receiving the signals transmitted by said stations including means for interpreting the received signals in the aircraft.

8. In a landing system for use in landing an aircraft on a landing field provided with one or more runways, said system including a remote transmitting station arranged in spaced relation from one end of the runway, a crystal control oscillator for generating a modulating current signal having a quarter wave length equal to the distance from the transmitting station to the center of the runway, means for expanding the generated oscillating signal to an ultra high frequency carrier current used in transmitting signals from said remote transmitting station, means for modulating the carrier current with the modulating current, means for expanding the modulating current to an intermediate frequency and auxiliary transmitting means for transmitting said intermediate frequency from said remote transmitting station; a local transmitting station arranged in spaced relation from the opposite end of the runway, said local transmitting station including means for receiving the signals transmitted by the remote transmitting station, said receiving means including means for utilizing the ultra high frequency signal and the intermediate signal to reproduce the original modulating signal, means for correcting the phase relation of said reproduced modulating signal with respect to the original modulating signal, and means for expanding modulating and transmitting the reproduced modulating signal from the local transmitting station; and means in the aircraft for receiving the signals transmitted by said stations, said aircraft receiving means including a dual channel ultra high frequency receiver for receiving the ultra high frequency signals, an auxiliary receiver for receiving the intermediate frequency, means for converting the intermediate frequency into a heterodyning frequency used by said dual channel receiver in reproducing the original modulating signals, and means for indicating the phase relation between the received signals.

EUGENE H. J. PHILLIPS.